United States Patent Office 3,444,761
Patented May 20, 1969

3,444,761
EPICYCLIC CHANGE-SPEED GEARING
Axel Charles Wickman, 69 S. Washington Drive,
St. Armands Key, Sarasota, Fla. 33577
Filed June 28, 1967, Ser. No. 649,563
Claims priority, application Great Britain, July 29, 1966,
34,063/66
Int. Cl. F16h *15/48*
U.S. Cl. 74—740         11 Claims

ABSTRACT OF THE DISCLOSURE

An epicyclic change-speed gearing has two similar simple epicyclic gear trains of which the planet carriers constitute a first pair of like elements, the sun gears are a second pair of like elements and the annuli are a third pair of like elements. One pair of like elements, other than the first pair, are reaction members of the gear trains, another pair of the like elements are power input and power output members of the gearing, and the remaining pair of like elements are drivingly coupled together.

---

The invention concerns an improved epicyclic change-speed gearing which is particularly, but not exclusively, applicable as a change-speed gear unit or part of a change-speed gear unit for use in a motor road vehicle.

It is well-known in the art to employ epicyclic change-speed gearings to constitute a complete gear unit for a motor road vehicle, or to constitute an auxiliary two speed gearing providing optionally a planetary drive ratio or a direct drive ratio. Such auxiliary two speed gearings are commonly termed overdrive or underdrive gearings depending on whether their planetary drive ratio is respectively a multiplication or a reduction ratio.

According to the invention an epicyclic change-speed gearing includes first and second planet carrier elements supporting respective axially spaced first and second planet gear sets which are independently rotatable, the first planet gear set meshes with a first sun gear element and with a first annulus gear element to form a first gear train, the second planet gear set meshes with a second sun gear element and with a second annulus gear element to form a second gear train, the first and second planet carrier elements constitute a first pair of like elements, the first and second sun gear elements constitute a second pair of like elements, the first and second annulus gear elements constitute a third pair of like elements, one pair of like elements other than the said first pair are arranged to be the reaction members of the first and second gear trains, another pair of like elements are arranged to be the power input and power output members of the gearing, the remaining pair of like elements are drivingly coupled together, one of the said gear trains has its respective reaction member arranged such that it can transmit drive optionally at a direct drive ratio or at a planetary underdrive ratio, and the other of said gear trains has its respective reaction member arranged such that it can transmit drive optionally at a direct drive ratio or at a planetary overdrive ratio. Each planet gear set usually includes two or three planet gears but the word "set" is intended to include a single planet gear or more than three planet gears, if it is considered desirable.

According to another feature of the invention a uni-directional clutch may be arranged operatively between the reaction member of the underdrive gear train and a nonrotary casing for locking the reaction member of the underdrive gear train to the casing whenever the underdrive gear train is transmitting drive in a forward direction at the underdrive ratio. Furthermore, a unidirectional clutch is preferably arranged operatively between the reaction member of the overdrive gear train and the power input member of the overdrive gear train for locking the reaction member of the overdrive gear train to the power input member of the overdrive gear train whenever the overdrive gear train is transmitting drive in a forward direction at the direct drive ratio.

According to a further feature an axially-movable friction engaging member may be rotatively fast with the reaction member of the underdrive gear train and is arranged to be moved axially from a position in which it engages a non-rotary casing to hold the reaction member against rotation whereby the underdrive gear train will transmit drive at the underdrive ratio, to a position in which it engages a clutch surface of another element of the underdrive gear train to inhibit the planetary action whereby the underdrive gear train will transmit drive at the direct drive ratio. Preferably an axially-movable friction engaging member is rotatively fast with the reaction member of the overdrive gear train and is arranged to be moved axially from a position in which it engages a non-rotary casing to hold the reaction member against rotation whereby the overdrive gear train will transmit drive at the overdrive ratio, to a position in which it engages a clutch surface of another element of the overdrive gear train to inhibit the planetary action whereby the overdrive gear train will transmit drive at the direct drive ratio.

According to yet another feature of the invention the underdrive gear train and the overdrive gear train may be arranged such that their planetary ratios are of substantially the same magnitude, and the gearing is arranged to provide three drive ratios comprising a reduction ratio which is given by the joint selection of the underdrive ratio of the underdrive gear train and the direct drive ratio of the overdrive gear train, a direct drive ratio which is given by the selection of the direct drive ratios of both the overdrive and underdrive gear trains, and a multiplication ratio which is given by the joint selection of the overdrive ratios of the overdrive gear train and the direct drive ratio of the underdrive gear train. Preferably each pair of like elements has the same number of gear teeth. This feature should enable production costs to be reduced.

According to another feature the underdrive gear train and the overdrive gear train may be arranged such that their planetary ratios are of different magnitudes, and the gearing is arranged to provide four drive ratios comprising a reduction ratio which is given by the joint selection of the underdrive ratio of the underdriven gear train and the direct drive ratio of the overdrive gear train, a direct drive ratio which is given by the selection of the direct drive ratios of both the overdrive and underdrive gear trains, a multiplication ratio which is given by the joint selection of the overdrive ratio of the overdrive gear train and the direct drive ratio of the underdrive gear train, and an intermediate drive ratio which is given by the joint selection of the overdrive ratio of the overdrive gear train and the underdrive ratio of the underdrive gear train. Preferably the first and second sun gear elements are arranged to be the reaction members, the first and second annulus gear elements are arranged to be the power input and power output members of the gearing, and the first and second planet carrier elements are drivingly coupled together. Furthermore the first and second planet carrier elements are preferably formed by a single planet carrier assembly supporting the said first and second planet gear sets.

According to another feature the said first and second planet gear sets may be arranged such that the gear or gears of the first set are axially aligned with the gear or gears of the second set and are supported from the planet carrier by a common spindle or spindles as appropriate.

According to a further feature the said power input member of the gearing may be adapted to be driven from a prime mover through a hydrodynamic fluid drive.

Furthermore, according to another feature of the invention, a further change-speed gearing may be arranged operatively in series with the overdrive and underdrive gear trains. Preferably the further change-speed gearing is arranged to transmit drive optionally at a reduction drive ratio, or at a direct drive ratio, or at a reverse reduction drive ratio, and the forward reduction drive ratio of the said further change-speed gearing is selected such that the total number of ratios provided by the overdrive and underdirve gear trains will be increased by at least two forward ratios.

According to yet another feature, the said further change-speed gearing may be a layshaft gearing.

According to another feature the said further change-speed gearing may be an epicyclic gearing including an auxiliary power input sun gear element meshing with a first auxiliary planet gear set supported from an auxiliary power output planet carrier element, a second auxiliary planet gear set meshing with the first auxiliary planet gear set, an auxiliary third panet gear set meshing with an auxiliary reaction sun gear, each gear of the second auxiliary planet gear set coaxial and rotatably secured to a corresponding gear of the third auxiliary planet gear set, an auxiliary reaction annulus gear element meshing with the second or third auxiliary planet gear set, friction engaging means rotatably secured to the auxiliary reaction sun gear and arranged optionally to engage either a brake surface defined by a non-rotary member whereby the auxiliary power input sun gear element will transmit drive to the auxiliary planet carrier element at a planetary underdrive ratio or a clutch surface rotatably fast with one of said elements whereby the auxiliary power input sun gear element will transmit drive to the auxiliary planet carrier element at a direct drive ratio, a brake means for optionally inhibiting rotation of the auxiliary reaction annulus gear element whereby the auxiliary power input sun gear element will transmit drive to the auxiliary planet carrier element at a planetary reverse reduction ratio, and control means arranged to inhibit the engagement of the friction engaging means with the brake or clutch surface whilst the auxiliary planet carrier is to be driven at the planetary reverse reduction ratio.

Preferably the auxiliary reaction sun gear is of greater diameter than the auxiliary power input sun gear element, and each gear of the auxiliary third planet gear set is of greater diameter than said corresponding gear of the auxiliary second planet gear set. Furthermore the auxiliary reaction annulus gear element preferably meshes with the auxiliary third planet gear set.

According to another feature the friction engaging means may be axially-movable between a first axial position in which it engages the brake surface and a second axial position in which it engages the clutch surface, the control means is arranged to move the friction engaging means to an axial position intermediate said first and second axial positions whenever the auxiliary planet carrier is to be driven at the planetary reverse reduction ratio whereby the friction engaging means will be disengaged from the brake surface and the clutch surface.

According to a further feature the control means may include a pair of opposed spring means arranged to bias the friction engaging means into its said intermediate axial position, a first force producing means is optionally operable against the action of one of said spring means to move the friction engaging means to its first axial position, and a second force producing means is optionally operable against the action of the other of said spring means to move the friction engaging means to its second axial position. Preferably at least one of said force producing means is a fluid operable piston and cylinder assembly. Furthermore the friction engaging member is preferably connected by a combined journal and thrust bearing to a double acting piston constituting said first and second force producing means.

According to yet another feature the clutch surface may be defined by the auxiliary reaction annulus gear element, and the auxiliary reaction annulus gear element is supported for free rotation by a combined thrust and journal bearing. This bearing will take the axial reaction of the engagement force of the clutch and should be chosen to be adequate for this purpose.

According to another feature the brake means, for optionally inhibiting rotation of the auxiliary reaction annulus gear element, may be a contractile brake band anchored to a non-rotatable casing and adapted to engage a corresponding annular coaxial brake surface defined by the auxiliary reaction annulus gear element.

According to a further feature a unidirectional clutch may be arranged operatively between the auxiliary power input sun gear element and the auxiliary power output planet carrier element such that the auxiliary planet carrier will be drivingly coupled to the auxiliary sun gear whenever the friction engaging means and the brake means are inoperative and the auxiliary planet carrier element is driven in the forward direction. When it is desired to start the engine by pushing or towing the motor vehicle, to which the epicyclic change-speed gearing is fitted, there will be no supply of pressurised fluid for operation of any of the friction engaging brake or clutch members, whereby drive could be transmitted from the auxiliary power output planet carrier element to the auxiliary power input sun gear element. However, the inclusion of the said unidirectional clutch enables this drive to be effected so that the engine may be started whereupon the normal supply of pressurised fluid will become available.

Furthermore, according to another feature, an epicyclic change-speed gearing may be arranged operatively in series with a further change-speed gearing which is adapted to provide a selection of forward drive ratios. Preferably the auxiliary power input sun gear element is arranged to be driven by the said further gearing.

According to another feature the forward drive ratios of the said further change-speed gearing are selected such that the total number of ratios provided by the two change-speed gearings will be increased by at least two forward ratios.

Two embodiments of the invention are shown by way of example in the accompanying drawings as specifically applied to two change-speed gear units giving six forward ratios for use in a motor road vehicle, in which.

Items which appear in more than one figure will be accorded the same reference numerals throughout.

Figure 1:
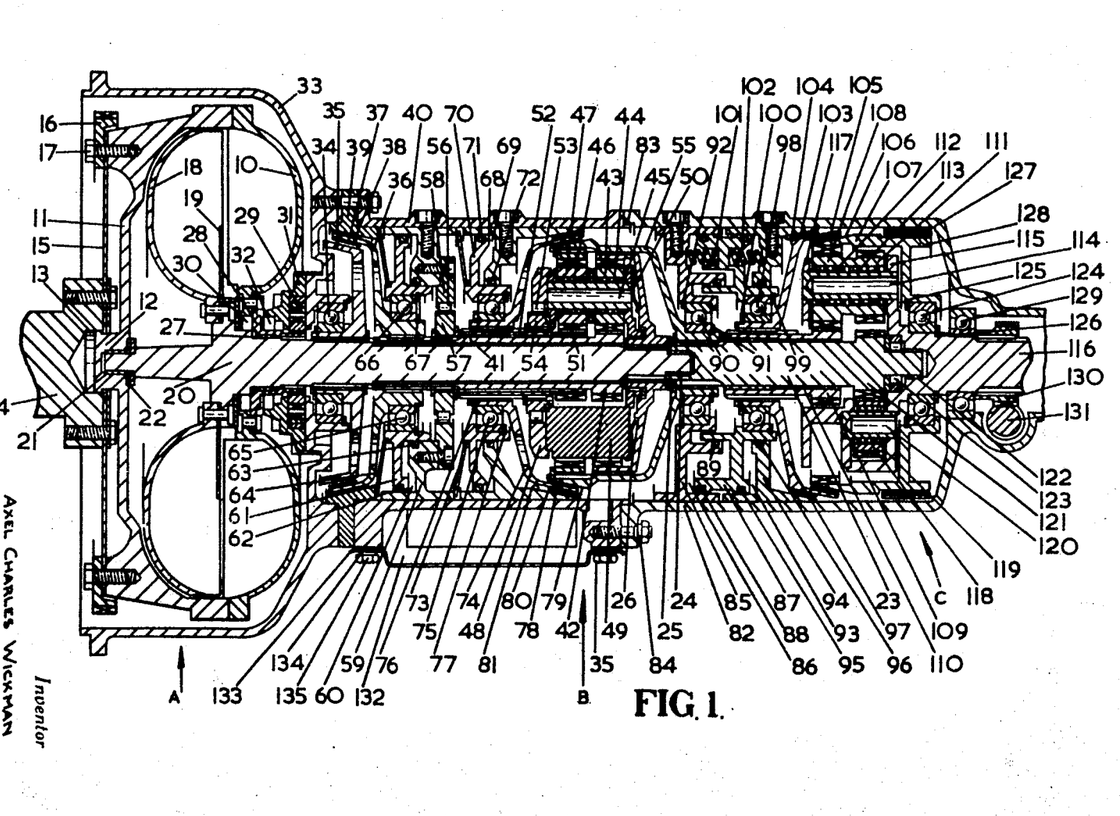
FIGURE 1 is a longitudinal vertical section through the casing, gear train and controls of the change-speed gear unit incorporating an epicyclic rear gear system.

Referring to the embodiment shown in FIGURE 1, A is a hydrodynamic fluid drive in the form of a fluid coupling, if desired a hydrodynamic torque converter could be used instead. B is an epicyclic gear system for providing three forward drive ratios and C is an epicyclic gear system for providing two forward and one reverse drive ratios.

The fluid coupling A has an impeller 10 and an associated front casing 11 which is supported by a spigot 12 within a bore 13 in an engine crankshaft 14. The front casing 11 is driven from the crankshaft 14 through a flexible drive plate 15 attached, with the engine starter ring gear 16, by studs and nuts 17. A driven member 18 of the fluid coupling and a baffle plate 19 are riveted to a flange formed integral with a front drive shaft 20 which is supported at its front end by the front casing 11 through a bush 21 and a thrust bearing 22. The rear of the front drive shaft 20 is supported by a centre drive shaft 23 through a bush 24 and a thrust bearing 25 adjacent to the first main annulus gear 26 of the epicyclic gear system B. The first main annulus gear 26 is supported by, and driven from the front drive shaft 20 through cooperating axially directed splines on both members. The impeller 10 is supported by the front drive shaft 20 through a bush 27 held in a sleeve member 28 attached to the impeller 10 and driving a front oil pump rotor 29. The fluid coupling is sealed by an oil seal 30. The front pump rotor 29 runs in a front pump housing 31 sealed by an oil seal 32 and attached to a bell housing 33 for fastening the epicyclic change-speed gear unit to the engine.

The front drive shaft 20 is supported from the bell housing 33 by a combined journal and thrust ball race 34 and a first frusto-conical clutch member 35 which is drivingly connected to the front drive shaft 20 by axially directed co-operating splines. A first axially-movable friction engaging member 36 has friction linings 37 secured on its inner end 38 on its outer surfaces for engaging respectively with the frusto-conical clutch member 35 and a first frusto-conical brake member 39. The frusto-conical brake member 39 is fastened by studs and nuts between the bell housing 33 and a front change-speed gear casing 40. Internal axially-directed splines drivingly connect the first axially-movable friction engaging member 36 to corresponding external splines on one end of an inner sleeve 41 in a manner to support the latter whilst allowing limited axial movement of the friction engaging member 36. The other end of the inner sleeve 41 is formed with integral gear teeth to act as a first main sun gear 42. Meshing with the latter and with the first main annulus gear 26 are three circumferentially spaced first main planet gears 43 of which one is shown supported by needle roller bearings 44 on a hollow pin 45. The latter is extended forwards to carry, on needle roller bearings 46, one of three second main planet gears 47 each identical to and corresponding to the three first main planet gears 43. The pins 45 are carried by a second main planet carrier element 48 and a first main planet carrier element 49 which are fastened together by unseen screws. The pins 45 are axially located between the second main planet carrier element 48 and a plate 50 whose outer portion is rolled over into a groove formed in the outer surface of the first main planet carrier element 49, and whose inner portion is dished to act as a collector of lubricating oil which thence passes through the hollow centres of the pins 45 and radial holes to lubricate the needle roller bearings 44 and 46. Meshing with the second main planet gears 47 is a second main sun gear 51 whose teeth are formed integral with an outer sleeve 52. A rear unidirectional clutch 53 acts between an internal surface of the second main planet carrier element 48 and an inner member 54 having internal axially directed splines to drivingly engage corresponding external splines on the outer sleeve 52. Also meshing with the second main planet gears 47 is a second main annulus member 55 at whose rear end an internally splined portion drivingly engages corresponding axially directed splines on the front end of the centre drive shaft 23.

A front unidirectional brake 56 has an inner member 57 internally splined to be driven by the external splines on the inner sleeve 41 and has an outer member 58 fastened by screws to a first partition member 59 which is fastened by screws to the front gear casing 40. Part of the first partition member is formed as a first fluid pressure operable cylinder 60 slidingly supporting a first co-acting piston 61 and sealed by O-rings 62 and 63. Axially pressing against the first piston 61 is a first frusto-conical spring 64 reacting against the first brake member 39.

Force is transmitted from the non-rotating first piston 61 and first spring 64 to the first axially-movable friction engaging member 36 by a combined thrust and journal ball race 65 axially located to the piston 61 by a shoulder and a snapring 66 and to the friction engaging member 36 by a shoulder and a snapring 67.

A second partition member 68 fastened by screws to the front gear casing 40 includes a second fluid pressure operable cylinder 69 coacting with a second piston 70 sealed by O-rings 71 and 72. A second frusto-conical spring 73 reacts axially between the second piston 70 and the first partition member 59. Force from the non-rotating second piston 70 and second spring 73 is transmitted to a second axially-movable friction engaging member 74 by a combined thrust and journal ball race 75 axially located to the second piston 70 by a shoulder and a snapring 76 and to the second friction engaging member 74 by a shoulder and a snapring 77. Internal splines formed in the second friction engaging member 74 drivingly engage with the external splines on the outer sleeve 52 while allowing limited axial movement to the former.

The outer portion of the second friction engaging member 74 has secured to it a frusto-conical internal friction lining 78 for engagement with a frusto-conical clutch surface portion 79 of the front annulus member 55, and a frusto-conical external friction lining 80 for engagement with a frusto-conical brake surface portion 81 of the second partition member 68.

A rear change-speed gear casing 82 is located to the front change-speed gear casing 40 by a spigot 83 and corresponding flanges held together by studs and nuts 84. Part of a third partition member 85, fastened by screws to the rear gear casing 82, forms a third fluid pressure operable cylinder 86 coacting with a third piston 87 sealed by O-rings 88 and 89. A combined thrust and journal ball race 90 supports the second main annulus 55, to which it is axially located between a shoulder and a snapring 91, from the third partition member 84, to which it is axially located between a shoulder and a snapring 92. The third piston 87 also acts in a fourth fluid pressure operable cylinder 93, formed in part of a fourth partition member 94 fastened by screws to the rear gear casing 82. The third piston 87 is sealed to the fourth cylinder 93 by O-rings 95 and 96, and supports a third axially-movable friction engaging member 97 through a combined thrust and journal ball race 98 which is axially located to the third piston 87 between a shoulder and a snapring 99 and to the third friction engaging member 97 between a shoulder and a snapring 100. Three pairs of axially operating circumferentially spaced identical helically coiled compression springs of which one pair 101 and 102 are shown, serve to bias the third piston 87 to the centre of its axial travel when equal fluid pressures are applied to the third and fourth cylinders 86 and 93.

The outer portion of the third friction engaging member 97 is formed to carry an external frusto-conical friction lining 103 secured thereto for engagement with a frusto-conical brake surface 104 defining part of the fourth partition member 94, and to carry an internal frusto-conical friction lining 105 secured thereto for engagement with a frusto-conical clutch surface 106 defining part of an auxiliary annulus gear member 107 which is part of the epicyclic gear system C. When in its centre position, the third piston 87 is arranged to hold the third axially-movable friction engaging member out of engagement with both the brake surface 104 and the clutch surface 106. Meshing with the teeth of the auxiliary annulus gear member 107 are three circumferentially spaced third auxiliary planet gears 108 of which one is shown, and meshing with the third planet gears 108 is an auxiliary reaction sun gear 109 whose teeth are formed integral with a rear sleeve member 110 on which external axially directed splines drivingly engage with corresponding internal splines formed in the third friction engaging member 97, whilst allowing limited axial movement to the latter.

Formed integral with each of the third auxiliary planet gears 108 but axially spaced therefrom are three second auxiliary planet gears 111, each combined planet pair rotatable on needle roller bearings 112 and 113 on a hollow pin 114 held in a planet carrier member 115 formed integral with the power output shaft 116 and held by unseen screws to a planet carrier member 117. Meshing with each of the second auxiliary planet gears 111 is a first auxiliary planet gear 118, rotatable on needle roller bearings 119 on a hollow pin 120 held by the planet carrier members 115 and 117. Also meshing with the first auxiliary planet gears 118 is an auxiliary input sun gear 121 whose teeth are formed integral with the centre drive shaft 23 which is supported by a bush 122 held in a bore in the power output shaft 116. Operable between the latter and the centre drive shaft 23 is a unidirectional clutch 123. The power output shaft 116 supports the auxiliary annulus member 107 by a combined thrust and journal ball race 124 axially located in the annulus member 107 between a shoulder and a snapring 125 and in the power output shaft between a shoulder and a snapring 126. A band brake 127, lined with friction material, is operable by an unseen fluid pressure piston and cylinder 144 to contract onto a cylindrical surface 128 of the auxiliary annulus member 107. The power output shaft 116 is supported by a ball race 129 held in the rear gear casing 82 and between a shoulder on the power output shaft 116 and a first speedometer driving gear 130 driven by the power output shaft 116 and meshing with a second speedometer driving gear 131. If preferred the auxiliary annulus gear 107 could be arranged to mesh with the second auxiliary planet gears 111 instead of the third auxiliary planet gears 108.

The lower part of the front gear casing 40 is formed as a sump 132 for the lubricating and operating fluid and is closed by a plate 133 sealed by a gasket 134 and held by screws 135.

Figure 2:
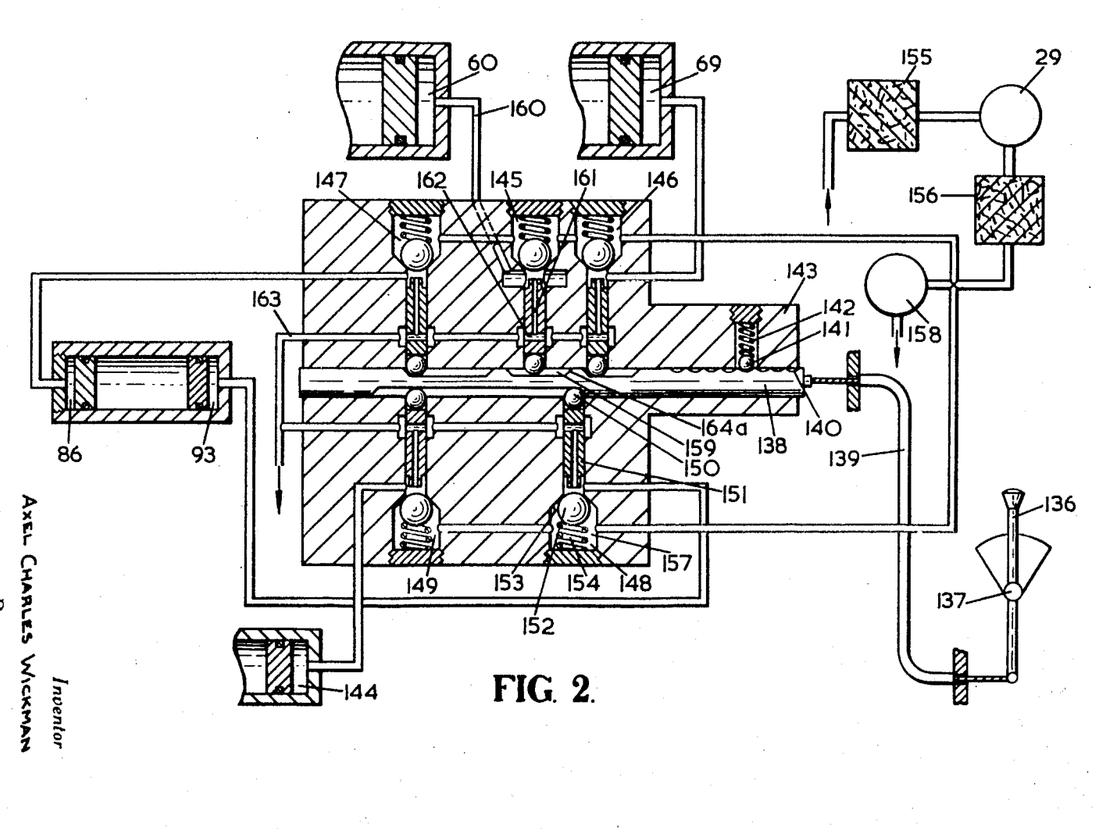
FIGURE 2 is an illustration, in diagrammatic form only of a hydraulic control circuit.

The fluid control system, whereby the various driving ratios may be engaged, will now be described with reference to FIGURE 2, which for clarity is in diagrammatic form only. Items to which reference has already been made will be indicated by the same reference numerals as in FIGURE 1.

A gear ratio selection lever 136 is arranged to move in a single plane on a pivot 137 fast with a convenient part of the motor vehicle. The selection lever 136 controls the position of a gear ratio selector valve 138 by means of a flexible connecting cable 139. A series of equally longitudinally spaced detent notches 140 coact with a ball 141 and spring 142, reacting against a plug screwed into a casing of the selector valve 143. Each detent notch 140, when engaged by the ball 141, serves to define the position of the selector valve 138 and selector lever 136 whereby, as the valve is moved from its right hand position to its left hand position the gear ratios will be engaged in the sequence:

Reverse
First (reduction ratio)
Second (reduction ratio)
Third (reduction ratio)
Neutral
Fourth (reduction ratio)
Fifth (direct drive ratio)
Sixth (overdrive ratio)

The supply and exhaust of operating fluid to and from each of the five fluid pressure operable cylinders 60, 69, 86, 93 and 144 is controlled by five corresponding control units 145, 146, 147, 148 and 149. Since each of the control units and the method whereby it operates the corresponding fluid cylinder is identical a detailed description will be given of only one control unit 145 and one cylinder 60. Each unit includes a ball 150 for contacting the selector valve 138, a plunger 151 movable by the ball 150 and both slidable laterally to the selector valve 138 in a bore in the selector valve casing 143. The end of the bore remote from the selector valve 138 is closed by a ball valve 152 urged against a conical seating 153 by a spring 154 reacting against a plug screwed into the selector valve casing 143.

Oil is drawn from the sump 132 by the pump 29 through a gauze filter 155 and discharged through a further gauze filter 156 to each of the chambers 157 forming part of the control units 145, 146, 147, 148, 149 and containing the spring loaded ball valve 152. A pressure relief valve 158 is set to maintain the pump outlet pressure at a suitable operating value, oil passed by the valve 158 being used to lubricate the gears and bearings.

In the positions of the selector valve 138 where oil pressure is not supplied to the fluid pressure operable cylinder 60 by its corresponding control unit 145, a flat 159 is formed on the side of the selector valve 138 to enable the ball 150 and plunger 151 to move towards the selector valve 138 and clear of the closed ball valve 152. Oil exhausting from the cylinder 60 through a passage 160 passes a portion of the plunger 151 having reduced diameter and through axial and radial drillings 161 and 162 respectively in the plunger 151 and a passage 163 to the sump. For pressurised oil to be supplied to the cylinder 60, the selector valve 138 is moved axially until a ramp 164a at one end of the flat 159 moves the ball 150 and the plunger 151 away from the selector valve 138. The plunger 151 engages the ball valve 152 which thereby closes the exhaust passage through the plunger. Further movement of the selector valve 138 causes the ball valve 152 to be displaced from its conical seating 153 so that pressurised fluid flows through the chamber 157 and the passage 160 to the fluid pressure operable cylinder 60. Raised portions of the selector valve 138 axially adjacent to the ramps serve to hold the ball valve 152 open as the selector valve is moved further. The relative disposition of the control units and the pattern of the flats on the selector valve is chosen so that when the selector valve is in the position corresponding to the engagement of each gear ratio, the necessary fluid pressure operable cylinders will be energised, as follows:

Sixth gear is selected to give an overdrive ratio. The control unit 145 is open to energise the first fluid pressure cylinder 60 to move the first axially-movable friction engaging member 36 into enagement with the frustoconical clutch member 35 so that the planet carrier elements 48 and 49 become the driving members of the epicyclic gearing system B. The control unit 146 is open to energise the second cylinder 69 so that the second axially-movable friction engaging member 74 is engaged with the second brake surface 81, bringing to rest the friction engaging member 74 and the associated second main sun gear 51 so that the second main annulus member 55 and the associated centre drive shaft 23 are driven at an overdrive ratio. The control unit 147 is open to energise the third cylinder 86 so that the third axially-movable friction engaging member 97 is engaged with the third annulus member 107 to lock the epicyclic gear system C at unit ratio. The overall drive ratio, is therefore, an overdrive.

Fifth gear is selected to give direct drive ratio. The control unit 145 is open as above whereby the planet carrier elements 48 and 49 become the driving members of the epicyclic gearing system B. The second main sun gear 51 is prevented from rotating faster than the planet carrier elements 48 and 49 by the unidirectional clutch 53 so that the epicyclic gearing system B becomes locked at unit drive ratio. The second frusto-conical spring urges the second axially-movable friction engaging member 74 into engagement with the second main annulus member 55 to retain the epicyclic gearing system B at unit drive ratio under over-run torque conditions. The control unit 147 is open whereby the epicyclic gearing system C is at unit ratio, as described with reference to the engagement of the sixth gear ratio, so that an overall direct drive ratio is obtained.

Fourth gear is selected to give an underdrive, or reduction ratio. The unidirectional brake 56 prevents the first main sun gear 42 from reverse rotation so that the planet carrier members 48 and 49 are driven at a reduction ratio. The unidirectional clutch 53 prevents the second main sun gear 51 from reverse rotation relative to the planet carrier element 48, so that the second main annulus member 55 is driven at the same rotational speed as the planet carrier members 48 and 49. The epicyclic gear system B, therefore, operates at a reduction ratio. The control unit 147 is open, as above so that the epicyclic gear system C operates at unit drive ratio. The overall drive ratio is, therefore, a reduction ratio. The first frusto-conical spring 64 and the second frusto-conical spring 73 respectively urge the first axially-movable friction engaging member 36 into engagement with the first frusto-conical brake member 39, and the second axially-movable friction engaging member 74 into engagement with the second main annulus member 55 so that the unidirectional brake 56 and the unidirectional clutch member 53 are prevented from slipping under over- torque conditions.

Neutral drive is selected when no control units are open, so that the third and fourth cylinders 86 and 93 are not energised and the third axially-movable friction engaging member 97 is held out of engagement so that no drive is transmitted by the epicyclic gear system C.

Third gear is selected to give a greater reduction ratio than fourth gear. The control units 145 and 146 are open so that the epicyclic gear system B operates at an overdrive ratio as described above with reference to the operation of sixth gear. The control unit 148 is open to energise the fourth fluid pressure operable cylinder 93 whereby the third axially-movable friction engaging member 97 engages the third frusto-conical brake surface 104 and is brought to rest, together with the associated auxiliary reaction sun gear 109 so that the epicyclic gear system C operates at a reduction ratio. As described later, the magnitude of this reduction ratio is chosen so that the product of the overdrive ratio afforded by the epicyclic gear system B and the reduction ratio afforded by the epicyclic gear system C is arranged to be a reduction ratio greater than that obtained when fourth gear is selected.

Second gear is selected to give a greater reduction ratio than third gear. The control unit 145 is open whereby the epicyclic gear system B operates at unit drive ratio, as described with reference to the selection of fifth gear. The control unit 148 is open so that the epicyclic gear system C operates at a reduction ratio, as described with reference to the selection of third gear.

First gear is selected to give a greater reduction ratio than second gear. The epicyclic gear system B is arranged to operate at a reduction ratio, as described with reference to the selection of fourth gear. The control unit 148 is open so that the epicyclic gear system C operates at a reduction ratio, as described with reference to the selection of third gear.

Reverse gear is selected to give a reverse drive reduction ratio. The epicyclic gear system B is arranged to operate at a reduction ratio as described with reference to the selection of fourth gear. No fluid pressure is applied to the third and fourth cylinders 86 and 93 so that the third axially-movable friction engaging member 97 is held out of engagement. The control unit 149 is open so that the cylinder 144 and coacting piston are energised to contract the band brake 127 and thereby bringing the auxiliary annulus member 107 to rest. The epicyclic gear system C then operates at a reverse drive reduction ratio. If it is more suitable for the vehicle to which the epicyclic change-speed gear unit is to be fitted, the epicyclic gear system B can be operated at a direct drive ratio or even an overdrive ratio instead of a reduction ratio, when reverse gear is selected.

Since, in the embodiment shown by way of example, the corresponding first and second members of the epicyclic gear system B are identical, the overdrive ratio obtained will be the inverse of the reduction ratio obtained. Preferably the reduction ratio afforded by the epicyclic gear system C is chosen to be approximately equal to the cube of the reduction ratio afforded by the epicyclic gear system B, so that the ratio of adjacent gear ratios will all be substantially equal.

In order that the engine of the motor road vehicle may be rotated when the power output shaft 116 is rotated, as when an attempt is made to start the vehicle by towing or pushing, the unidirectional clutch 123 is arranged so that the power output shaft 116 drives the centre drive shaft 23 and the associated second main annulus member 55. With no fluid operating pressure available, the epicyclic gear system B is in the underdrive ratio, so that the driven member 18 of the fluid coupling is rotated. By this means, there is no need for the inclusion of a second fluid pump to be driven from the power output shaft 116.

Figure 3:
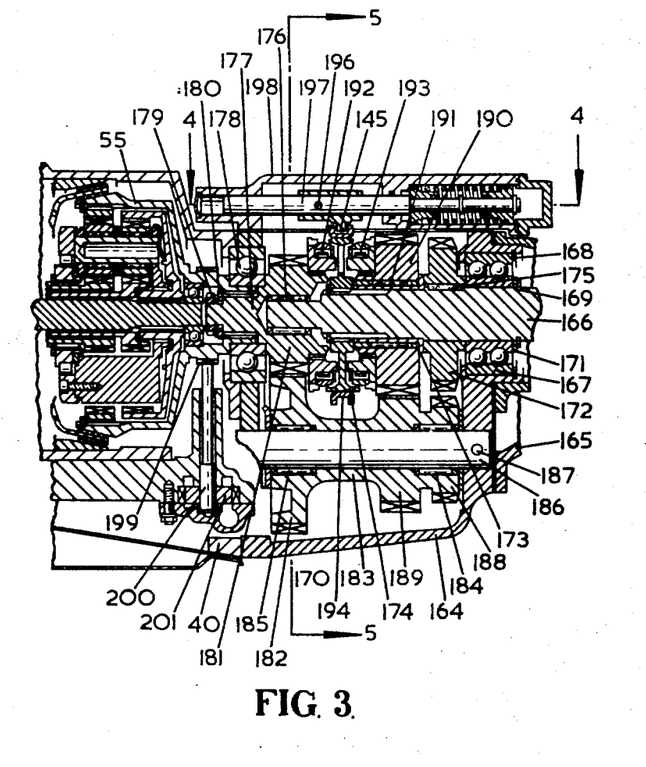
FIGURE 3 is a longitudinal vertical section of a layshaft gear system used in place of the epicyclic rear gear system.

FIGURE 3 shows the front epicyclic gear system B followed by a layshaft change-speed gearing used in place of the rear epicyclic change-speed gear system C.

A rear gear casing 164 is held to the front gear casing 40 by unseen studs and nuts. The rear gear casing 164 is closed at the rear by an extension casing 165 sealed by an unseen oil seal to the third motion shaft 166. A double row combined thrust and journal ball race 167 located in the rear gear casing 164 between a shoulder and a snapring 168 is located to the third motion shaft 166 between snaprings 169, 170 together with a shim 171, a reverse output gear 172, an integrally formed thrust bearing and tube 173 and a synchromesh member 174 which is also drivingly connected to the third motion shaft 166 by integrally formed splines. The reverse output gear 172 is drivingly connected to the third motion shaft by a key 175.

The front end of the third motion shaft 166 is supported by a needle roller race 176 in a bore formed in the rear end of the first motion shaft 177 which is located to the rear gear casing 164 by a ball race 178. This is further trapped by a shoulder formed in the second main annulus 55 which is drivingly connected by splines and held by a nut 179 and washer 180 to the first motion shaft 177. Formed integral with the first motion shaft 177 are helical teeth of a first constant mesh gear 181 meshing with a second constant mesh gear 182 formed integral with a layshaft gear cluster 183 which is supported by needle roller bearings 184, 185 on a longitudinally disposed stationary shaft 186 held in bores in the rear gear casing 164 and located by a peg 187. The layshaft gear cluster 183 includes a reverse driving gear 188 and a layshaft reduction gear 189 which meshes with an output reduction gear 190 located by a needle roller bearing 191 on the tube 173. Synchromesh units 192, 193 are attached to the first constant mesh gear 181 and the output reduction gear 190 respectively whereby the synchromesh member 174 may be moved forwards to engage the synchromesh unit 192 and lock the first motion shaft 177 to the third motion shaft 166 to provide a direct drive ratio, or may be moved backwards to engage the synchromesh unit 193 and lock the output reduction gear 190 to the third motion shaft 166 to provide a forwards reduction drive ratio.

A peripheral groove 194 formed in the outside of part of the synchromesh member 174 is engaged by a forwards selector fork 195 located by a screw 196 to a longitudinal forwards selector shaft 197 slidably supported in bores in the lid 198 of the rear gear casing 164.

A gear 199 formed integral with the second main annulus 55 meshes with an unseen gear to drive a shaft 200 of an oil pump 201.

Figure 4:
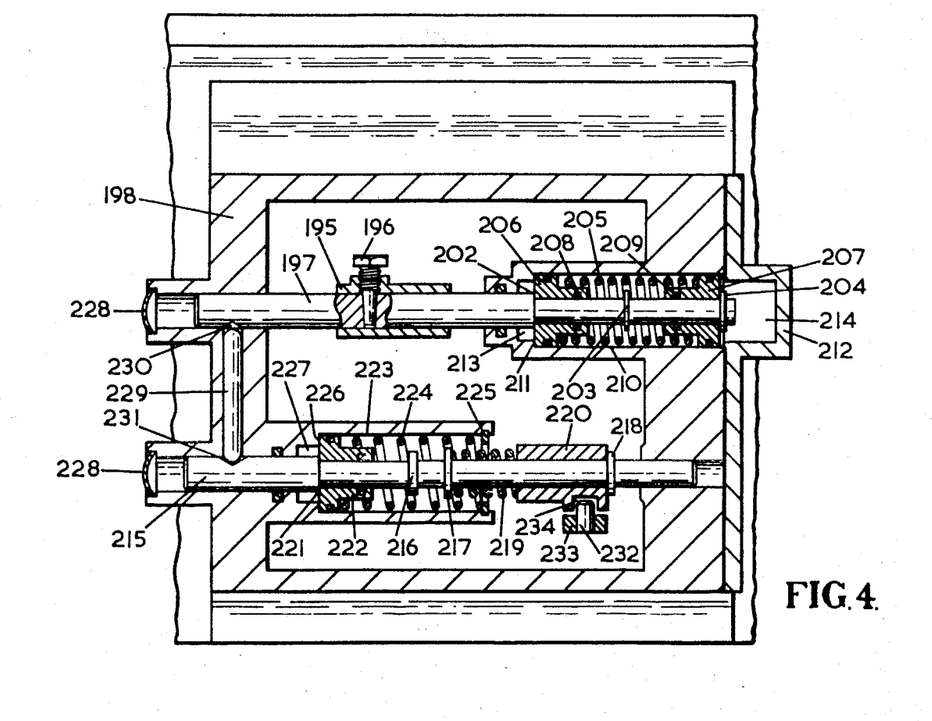
FIGURE 4 is a horizontal section through part of FIGURE 3.

In FIGURE 4 the forwards selector shaft 197 has a portion of reduced diameter forming a shoulder 202 and having grooves locating spring clips 203, 204. Urged against the shoulder 202 and the spring clip 204 by a helically coiled compression spring 205 are pistons 206, 207 respectively slidable on the forward selector shaft 197 and sealed therefrom by O-rings 208, 209.

The pistons 206, 207 are slidable in a bore 210 formed in part of the lid 198 between a shoulder 211 and an end cap 212 held to the lid by screws. Operating fluid is admittable through unseen passages to cavities 213, 214 for moving the pistons 206, 207 respectively.

Parallelly spaced from the forwards selector shaft 197, a reverse selector shaft 215 is slidable in bores in the lid 198. Spring clips 216, 217 and 218 engage in grooves in the reverse selector shaft 215 and a helically coiled compression spring 219 reacts on the spring clip 217 to urge a bronze block 220, mounted for axial sliding on the reverse selector shaft 215, against the spring clip 218. Also slidable on the reverse selector shaft 215, between a shoulder 221 and the spring clip 216, is a hydraulic piston 222 slidable in a corrensponding cylinder 223 formed in part of the lid 198. A helically coiled compression spring 224 reacts on a spring clip 225, held in a groove in the cylinder 223, to urge the piston 222 against a shoulder 226 at the end of the cylinder 223. Operating fluid is admittable through an unseen passage to a cavity 227 for operating the piston 222. The ends of the bores in which the selector shafts are slidable are sealed by the end cap 212 and by self retaining plugs 228.

When no fluid operating pressure is applied to the cavities 213, 214, the spring 205 urges the piston 206 against the shoulders 202 and 211 and the piston 207 against the spring clip 204 whereby the forward selector shaft 197 is biased to the mid or neutral position of its travel. When no fluid operating pressure is applied to the cavity 227 the spring 224 urges the piston 222 against the shoulders 221 and 226, whereby the reverse selector shaft 215 is biased to the left hand or neutral position.

A plunger 229 slidable in a bore in the lid transverse to the selector shafts is arranged so that one or other of its ends engages notches 230, 231 formed in the selector shafts such that only one selector shaft is movable from the neutral position at a time. A peg 232 fast in the upper end of a reverse selector lever 233 engages in a vertical slot 234 formed in the bronze block 220.

Figure 5:
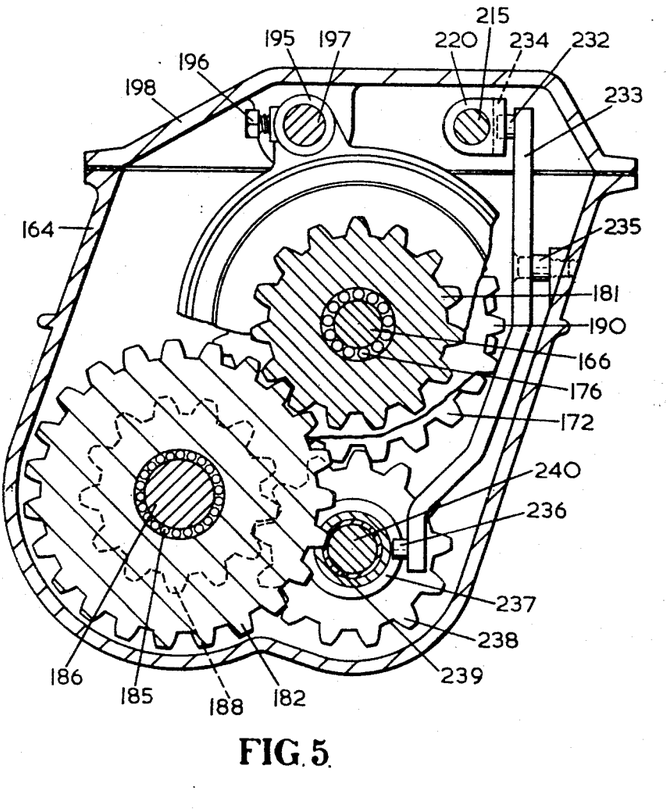
FIGURE 5 is a vertical transverse section through part of FIGURE 3.

In FIGURE 5 the reverse selector lever 233 is seen pivoted near its centre on a pin 235 screwed into the side of the rear gear casing 164. At the lower end of the reverse selector lever 233 a peg 236 engages in a peripheral groove 237 formed in part of a reverse idler gear 238 slidably and pivotally supported by a bush 239 on a stationary longitudinal shaft 240.

The control circuit for operating the rear layshaft change-speed gearing is identical to that described for operating the alternative rear epicyclic change-speed gearing, the cavities 213, 214 and 227 being supplied with operating fluid in place of the cylinders 93, 86 and 144 respectively.

To select direct drive in the layshaft change-speed gearing, pressurised operating fluid is fed to the cavity 214 to move the piston 207 to the left in FIGURES 3 and 4, against the bias of the spring 205, until the piston 207 abuts the spring clip 203 whereby the piston moves the forwards selector shaft 197, the selector fork 195 and the synchromesh member 174 until the latter is engaged with the synchromesh unit 192 to transmit drive directly from the first motion shaft 177 to the third motion shaft 166.

The forwards reduction ratio is selected when pressurised operating fluid is fed to the cavity 213 to move the piston 206 to the right, against the bias of the spring 205, until the piston 206 abuts the spring clip 203 whereby the piston 206 moves the forwards selector shaft 197, the selector fork 195 and the synchromesh member 174 until the latter is engaged with the synchromesh unit 193, to connect the first motion shaft 177 to the third motion shaft 166 through the reduction gear train 181, 182, 189 and 190.

The reverse reduction ratio is selected when pressurised operating fluid is fed to the cavity 227 to urge the piston 222 to the right against the bias of the spring 224, until the piston abuts the spring clip 216 whereby the piston 222 moves the reverse gear selector shaft 215, the spring clip 217, the spring 219, the bronze block 220 and the peg 232 to the right so that the lever 233 moves the peg 236 and the reverse idler gear 238 to the left until the latter engages both of the gears 172 and 188. The gear train 181, 182, 188, 238 and 172 constitute a reverse reduction ratio between the first motion shaft 177 and the third motion shaft 166. If the reverse idler gear 238 is not able to engage the gears 172 and 188 the spring 219 will be compressed to urge the bronze block 220 to the right until engagement is effected.

If problems occur in the operation of the transmission due to the torque transmitted by the fluid coupling or torque converter when the engine is idling, for example difficulty in engaging or disengaging the ratios of the layshaft gearbox, a conventional disengageable friction clutch may be used instead of the fluid coupling or torque converter.

Furthermore, the operating conditions of the synchromesh mechanisms may be improved by selecting the reduction ratio of the layshaft change-speed gearing C to be equal to the square of the reduction ratio afforded by the epicyclic system B. The overall transmission would then be operated to give five forward drive ratios and a reverse drive ratio. The overall ratio given by the selection of the reduction ratio in the epicyclic system B together with direct drive in the layshaft change-speed gearing C would be identical to the overall ratio given by the selection of the overdrive ratio in the epicyclic system B together with the reduction ratio of the layshaft change-speed gearing C. In this way by disengaging the layshaft gearing and the changing from overdrive to underdrive, or vice versa as appropriate, in the epicyclic gear system B, the dogs forming part of the synchromesh mechanism to be engaged will be already substantially synchronised, thereby relieving the synchromesh mechanisms of heavy duty when a ratio change is made in the layshaft change-speed gearing C. Whenever a change of overall ratio is to be made which involves a change of ratio in the layshaft change-speed gearing C, the above procedure may be adopted as a preliminary operation whereby the change of ratio in the change-speed gearing C may be effected easily, without changing the overall ratio, and the desired change of overall ratio may then be effected in the epicyclic change-speed gear system B.

What I claim as my invention and desire to secure by Letters Patent of the United States is:

1. An epicyclic change-speed gearing including a non-rotary casing, a first planet gear set, a second planet gear set axially spaced from said first planet gear set, a first planet carrier element supporting said first planet gear set, a second planet carrier element supporting said second planet gear set, a first sun gear element and a first annulus gear element mesh with said first planet gear set to form a first gear train, a second sun gear element and a second annulus gear element mesh with said second planet gear set to form a second gear train, the first and second planet carrier elements constitute a first pair of like elements, the first and second sun gear elements constitute a second pair of like elements, the first and second annulus gear elements constitute a third pair of like elements, wherein the improvement comprises that one pair of said like elements other than said first pair are reaction members of the first and second gear trains, another pair of said like elements are power input and power output members of the gearing, the remaining pair of said like elements are drivingly coupled together, one of said gear trains has its respective reaction member connectible to said casing such that it can transmit drive optionally at a direct drive ratio or at a planetary underdrive ratio, and the other of said gear trains has its respective reaction member connectible to said casing such that it can transmit drive optionally at a direct drive ratio or at a planetary overdrive ratio.

2. An epicyclic change-speed gearing, as in claim 1, in which a unidirectional brake operatively connects said reaction member of the underdrive gear train to said casing for locking the reaction member of the underdrive gear train to said casing whenever the underdrive gear train is transmitting drive in a forward direction at the underdrive ratio.

3. An epicyclic change-speed gearing, as in claim 1, in which a unidirectional clutch operatively connects said reaction member of the overdrive gear train and said power input member of the overdrive gear train for locking the reaction member of the overdrive gear train to the power input member of the overdrive gear train whenever the overdrive gear train is transmitting drive in a forward direction at the direct drive ratio.

4. An epicyclic change-speed gearing, as in claim 1, in which part of said casing defines a brake surface, part of an element of one of said gear trains other than the reaction element defines a clutch surface, a friction engaging member, said friction engaging member is rotatively fast with said reaction member of said one of the gear trains, said friction engaging member is optionally axially-movable from a position in which it engages said brake surface to hold said reaction member of said one of the gear trains against rotation whereby the gear train will transmit drive at an underdrive ratio, to a position in which said axially-movable friction engaging member engages said clutch surface to inhibit the planetary action whereby the gear train will transmit drive at direct drive ratio, and the other of said gear trains has its respective reaction member connectible to said casing such that it can transmit drive optionally at a direct drive ratio or at a planetary overdrive ratio.

5. An epicyclic change-speed gearing, as in claim 1, in which one of said gear trains has its respective reaction member connectible to said casing such that it can transmit drive optionally at a direct drive ratio or at a planetary underdrive ratio, part of said casing defines a brake surface, part of an element of the other of said gear trains other than the reaction element defines a clutch surface, a friction engaging member, said friction engaging member is rotatively fast with said reaction member of said other of the gear trains, said friction engaging member is optionally axially-movable from a position in which it engages said brake surface to hold said reaction member of said other of the gear trains against rotation whereby the gear train will transmit drive at an overdrive ratio, to a position in which said axially-movable friction engaging member engages said clutch surface to inhibit the planetary action whereby the gear train will transmit drive at direct drive ratio.

6. An epicyclic change-speed gearing, as in claim 1, in which the said one gear train and the said other gear train have planetary ratios of substantially the same magnitude and the gearing provides three operation drive ratios comprising a reduction ratio given by the joint selection of the underdrive ratio of the said one gear train and the direct drive ratio of the said other gear train, a direct drive ratio given by the selection of direct drive ratios of both gear trains and a multiplication ratio given by joint selection of the overdrive ratio of the said other gear train and the direct drive ratio of the said one gear train.

7. An epicyclic change-speed gearing, as in claim 1, in which the said one gear and the said other gear have planetary ratios of differing magnitudes and the gearing provides four optional drive ratios comprising a reduction ratio given by the joint selection of the underdrive ratio of the said one gear train and the direct drive ratio of the said other gear train, a direct drive ratio given by the selection of direct drive ratios of both gear trains, a multiplication ratio given by joint selection of the overdrive ratio of the said other gear train and the direct drive ratio of the said one gear train, and an intermediate drive ratio which is given by the joint selection of the underdrive ratio of the said one gear train and the overdrive ratio of the said other gear train.

8. An epicyclic change-speed gearing including a nonrotary casing, a first planet gear set, a second planet gear set axially spaced from said first planet gear set, a first planet carrier element supporting said first planet gear set, a second planet carrier element supporting said second planet gear set, a first sun gear element and a first annulus gear element mesh with said first planet gear set to form a first gear train, a second sun gear element and a second annulus gear element mesh with said second planet gear set to form a second gear train, wherein the improvement comprises that the said first and second gear elements are reaction members, the first annulus gear element is the power input member of the gearing, the second annulus gear element is the power output member of the gearing, and the first and second planet carrier elements are drivingly coupled together.

9. An epicyclic change-speed gearing, as in claim 8, in which each gear of the first planet gear set is axially aligned with a corresponding gear of the second planet gear set to form a pair of corresponding planet gears, and a spindle supports each pair of corresponding planet gears from said planet carrier assembly.

10. An epicyclic change-speed gearing, as in claim 1, and a hydrodynamic fluid drive element, said hydrodynamic fluid drive element connected to drive said first annulus gear element for transmitting drive into said gearing.

11. An epicyclic change-speed gearing, as in claim 1, and a further change-speed gearing connected in series with said epicyclic change-speed gearing, said further change-speed gearing having optionally selectable gearing to transmit drive at direct drive ratio, at a reduction drive ratio or at a reverse drive ratio.

References Cited

UNITED STATES PATENTS

| 2,851,907 | 9/1958 | DeNormanville | 74—781 |
| 2,971,385 | 2/1961 | Miller | 74—761 X |
| 3,043,162 | 7/1962 | Hobbs | 74—767 |
| 3,095,755 | 7/1962 | Duffy | 74—761 X |
| 3,144,788 | 8/1964 | Wickman | 74—761 |
| 3,182,528 | 5/1965 | Lamburn | 74—740 |
| 3,217,846 | 11/1965 | Smirl | 74—740 X |
| 3,233,478 | 2/1966 | General et al. | 74—761 |

ARTHUR T. McKEON, *Primary Examiner.*

U.S. Cl. X.R.

74—761, 767, 781